Aug. 25, 1942.           H. WINTERS                2,293,872
                    FOOD CHOPPER ATTACHMENT
                     Filed March 20, 1941
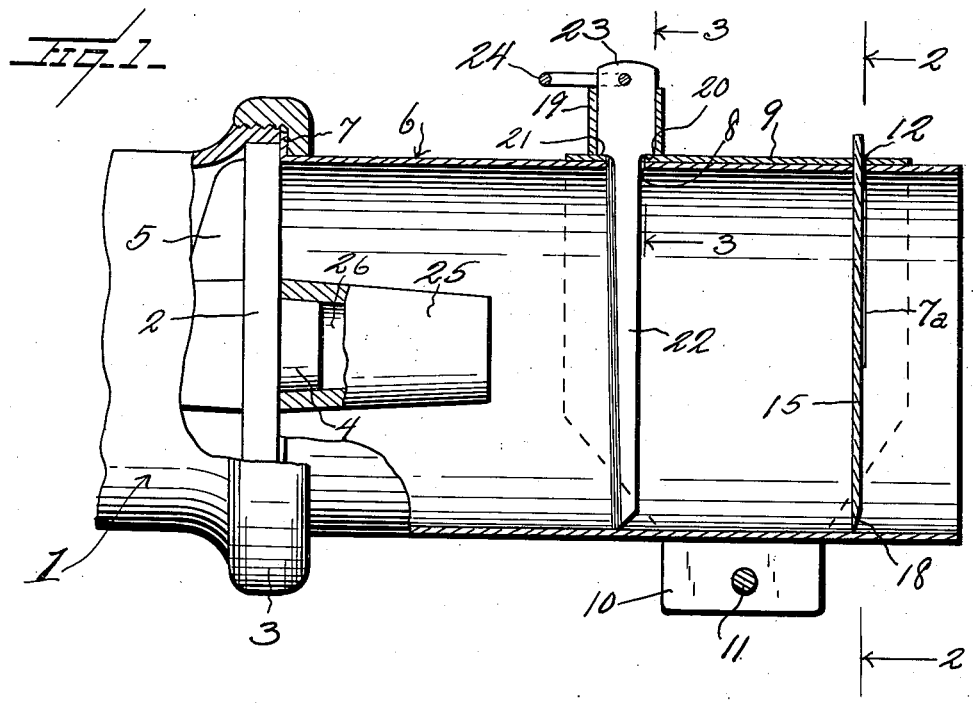
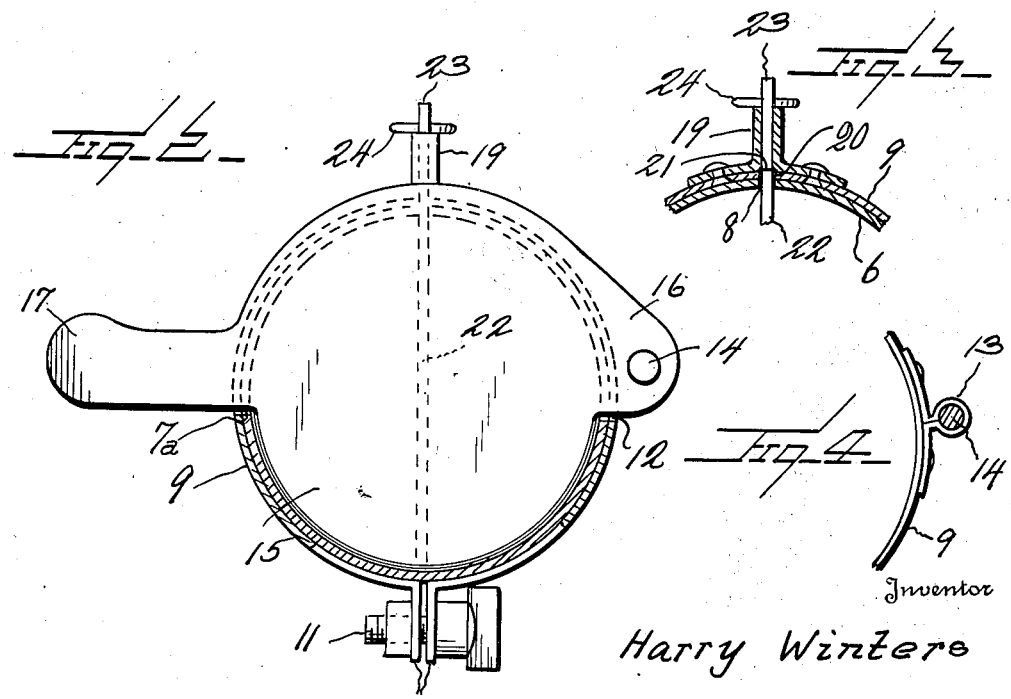
Inventor
Harry Winters
By Watson E. Coleman
       Attorney Patented Aug. 25, 1942

2,293,872

UNITED STATES PATENT OFFICE 2,293,872

FOOD CHOPPER ATTACHMENT

Harry Winters, Grand Forks, N. Dak.

Application March 20, 1941, Serial No. 384,381

7 Claims. (Cl. 146—182)

This invention relates to food chopping machines and pertains particularly to an attachment therefor into which the chopped or ground food is discharged.

The primary object of the present invention is to provide an attachment for a meat grinder by means of which meat which is ground up for the making of hamburger steak or other ground meat, may be formed as it is ejected from the grinding machine into a meat roll or loaf which can be transferred to a pan for baking and, after being baked, can be readily sliced for serving.

Another object of the invention is to provide an attachment of the character stated which will produce such meat roll or loaf with a tubular center whereby steam may enter the center of the loaf and cause the same to be more effectively and thoroughly cooked.

Still another object of the invention is to provide a device for attachment to a meat grinder, by means of which the ground meat may be readily cut into cakes as it issues from the machine, to be fried in individual patties.

A still further object of the invention is to provide an attachment of the character stated which, in the formation of a meat loaf, can be caused to split such loaf lengthwise to divide the same into two semi-cylindrical portions.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in longitudinal section of the device embodying the present invention, the same being shown applied to the forward end of a meat grinder.

Fig. 2 is a sectional view on the line 2—2 of Fig. 1.

Fig. 3 is a sectional view on the line 3—3 of Fig. 1.

Fig. 4 is a detailed view illustrating the hinge connection for the chopping knife.

Referring now more particularly to the drawing, the numeral 1 generally designates the discharge end of a meat grinding machine to which end is secured the usual die plate 2 by means of a locking ring 3. Such die plates customarily have a central hub 4 by means of which the attachment of the forward end of the screw, not shown, together with the cutter 5, a portion of which is shown, is maintained in proper position for rotation within the body of the cutting machine.

The present attachment comprises a relatively long cylinder 6 which is open at its two ends and which has at one end the encircling outwardly extending flange 7 which is engaged by the lock ring 3 to secure the cylinder to the discharge end of the machine coaxially with the die plate. Adjacent its outer end the cylinder has formed transversely thereof and substantially half-way thereacross, a slot 7a.

Inwardly from this slot, the wall of the cylinder is provided with a short longitudinally extending knife receiving slot 8.

The numeral 9 designates a split cuff which is secured about the cylinder and which has at its two ends the outwardly extending ears 10 which are drawn together by a screw 11, so as to clamp the cuff around the cylinder. This cuff is provided with a transverse slot 12 through substantially half its width to correspond and aline with the slot 7a when the cuff is in position on the cylinder. At one end of the slot 12, the cuff carries a hinge ear 13, which is located at one side of the slot 12 and is directed axially of the cuff, and through this ear extends a pintle 14.

The numeral 15 designates a chopping knife which is substantially circular or disk-like in form and has extending from one point along its periphery, the tongue 16 which is apertured to receive the pintle 14. Diametrically opposite from the tongue 16 is a handle 17. This knife is designed to be oscillated on the pintle 14 through the alined slots 7a—12 to extend across and close the outer end of the cylinder 6, and the lower half of the periphery of the chopping knife 15 is sharpened, as indicated at 18, so that the chopping knife may cut through a body of meat packed in the cylinder.

Inwardly from the slot 12 there is secured to the outer side of the cuff the radially extending sleeve 19, the interior cross-section of which is in the form of an elongated rectangle, the length of which extends axially of the cylinder, and this sleeve is alined with the slot 8 and with a corresponding slot 20 formed through the cuff. The length of the interior of the sleeve 19 is slightly greater than the length of the slot 8, so that there are formed at the ends of the slot 8, shoulders against which engage shoulders 21 of a knife blade 22, which is designed to extend diametrically through the cylinder, as illustrated.

The outer end of the knife blade is connected with a shank portion 23 which is of a width to snugly fit in the sleeve 19, so that the blade will be held firmly in position across the cylinder.

A ring 24 or other means is connected with the shank of the blade to facilitate its removal and also to provide means for hanging the blade when it is not in use.

The numeral 25 designates an elongated tapered body constituting a pilot which is secured at the inner end of the cylinder upon the axial center thereof and which has its tapered end extended toward the open end of the cylinder. This pilot at the end nearest the die plate is provided with a tapered bore 26 for the reception of the stud 4 of the die plate. The pilot is, therefore, frictionally secured upon the stud and it will be seen that when the ground meat is passing through the die plate to fill the cylinder, it will flow around the pilot and the pilot will thus form a tubular passage through the mass of meat.

From the foregoing, it will be readily apparent that the present device provides a receiver into which meat is ejected as it leaves the grinding machine, and if the chopping knife is closed or in position across the cylinder, the meat will be compressed into a cylindrical loaf in which form it can be removed and baked as a solid mass. It will also be apparent that in the formation of such a loaf, the pilot will form a central opening therethrough, through which steam may pass to bring about the more thorough cooking of the loaf.

The chopping knife may also be employed if desired, to cut the loaf in sections as it is forced outwardly through the cylinder. During this operation, the splitting knife 22 may be removed, however, if it is desired to divide the loaf longitudinally, the splitting knife may be inserted to extend across the cylinder and it will function to divide the loaf lengthwise as the loaf is formed in the cylinder.

What is claimed is:

1. In a meat chopping machine having a chopped meat outlet, a receiver comprising an elongated cylinder open at its two ends and secured at one end to the meat chopper to extend from and concentrically with the said outlet, means for closing the outer end of the cylinder, and means disposed at the inner end of the cylinder and extending partially longitudinally thereof upon its longitudinal axis for forming a central passage through a meat mass discharged from the chopper into the cylinder.

2. In a meat chopping machine having a chopped meat outlet, a receiver comprising an elongated cylinder open at its two ends, means for securing the cylinder at one end to the meat chopper to extend from and concentrically with the said outlet, the cylinder having a slot in the wall thereof, a cutting blade removably carried by the cylinder and extending through said slot diametrically across the cylinder to effect the longitudinal division of a mass of meat received in the cylinder from the chopper, and a guide supported on the cylinder in alinement with the slot for holding the knife at one end.

3. In a meat chopping machine having a chopped meat outlet, a receiver comprising an elongated cylinder open at its two ends and secured at one end to the meat chopper to extend from and concentrically with the said outlet, a shiftable means supported upon the cylinder and movable to a position transversely of the cylinder for closing the cylinder adjacent its outer end, said cylinder having a slot through the wall thereof inwardly of said means, and a knife insertible through the slot to be supported in the cylinder diametrically thereacross to effect the lengthwise division of a mass extruded from the cutter into the cylinder between the cylinder and said means.

4. An attachment for a meat chopping machine comprising an elongated cylinder open at its two ends, means at one end of the cylinder for securing the same to the machine in axial alinement with the outlet thereof, said cylinder having a slot in the wall thereof, and means supported on the cylinder in alinement with the slot forming a radially extending flat guide, and a knife designed for extension through the guide and slot into the cylinder to position transversely of the cylinder, the knife constituting a blade portion and a flat shank portion, said shank portion being designed to fit in the guide, the knife having shoulders at the inner end of the shank for limiting movement of the knife through the slot, and said blade being of a length to extend entirely across the cylinder.

5. A meat chopping machine attachment as set forth in claim 4 in which the machine is provided with a locking ring threadable upon the meat outlet end thereof and in which the said means for securing the cylinder to the machine comprises a lateral encircling flange at the attached end of the cylinder which is clamped against the end of the machine by the locking ring, and said knife guide being removably secured on the cylinder to facilitate sliding the locking ring to position against the flange.

6. An attachment of the character stated for a meat chopping machine, comprising an elongated cylinder open at both ends and having a lateral flange at one end to facilitate its attachment to the machine in axial alinement with the meat outlet thereof, a split cuff designed to receive and grip the cylinder, the cylinder having a slot in the wall thereof and the cuff having a slot designed to aline with the cylinder wall slot, a guide carried by the cuff in alinement with the slot thereof, a knife having a blade portion and shank portion and a shoulder at the inner end of the shank portion, said cuff and cylinder slots being designed to receive the blade portion only of the knife and said guide being designed to receive the shank, the said shoulder abutting the cuff to limit the inward movement of the blade, and said blade being of a length to extend diametrically across the cylinder.

7. A meat chopping machine attachment as set forth in claim 6 in which the cylinder is provided with a transverse slot extending through substantially half the diameter thereof and said cuff has a corresponding slot for alinement with the transverse slot, said transverse slot being disposed upon the sides of the first mentioned slots remote from the flanged end of the cylinder, and a disc-like knife pivotally attached to the cuff adjacent one end of the slot of the cuff and adapted to be oscillated transversely of the cylinder through the transverse slot of the cylinder for severing material in the cylinder and to form a partition wall therein.

HARRY WINTERS.